(12) United States Patent
Heiniger et al.

(10) Patent No.: US 10,018,988 B2
(45) Date of Patent: Jul. 10, 2018

(54) POSITIONING DEVICE

(71) Applicant: ETEL S.A., Môtiers (CH)

(72) Inventors: Laurent Heiniger, Neuchâtel (CH); Jean-Marc Vaucher, Couvet (CH)

(73) Assignee: ETEL S.A., Môtiers (CH)

( * ) Notice: Subject to any disclaimer, the term of this patent is extended or adjusted under 35 U.S.C. 154(b) by 174 days.

(21) Appl. No.: 15/021,051

(22) PCT Filed: Jul. 21, 2014

(86) PCT No.: PCT/EP2014/065611
§ 371 (c)(1),
(2) Date: Mar. 10, 2016

(87) PCT Pub. No.: WO2015/036153
PCT Pub. Date: Mar. 19, 2015

(65) Prior Publication Data
US 2016/0224008 A1    Aug. 4, 2016

(30) Foreign Application Priority Data

Sep. 11, 2013 (EP) .................................... 13183861

(51) Int. Cl.
*G05B 19/402* (2006.01)
*B23Q 1/01* (2006.01)
(Continued)

(52) U.S. Cl.
CPC ........... *G05B 19/402* (2013.01); *B23Q 1/012* (2013.01); *B23Q 1/626* (2013.01); *B23Q 11/001* (2013.01);
(Continued)

(58) Field of Classification Search
None
See application file for complete search history.

(56) References Cited

U.S. PATENT DOCUMENTS 6,161,995 A * 12/2000 Wakazono ............. B23Q 1/015
408/234
8,040,099 B2    10/2011 Coleman et al.
(Continued)

FOREIGN PATENT DOCUMENTS

DE          102 49 334       5/2004
DE      10 2005 001 845      7/2006
(Continued)

OTHER PUBLICATIONS

International Search Report, dated Oct. 10, 2014, issued in corresponding International Application No. PCT/EP2014/065611.

*Primary Examiner* — Dennis M Butler
(74) *Attorney, Agent, or Firm* — Hunton Andrews Kurth LLP

(57) ABSTRACT

A portal-type positioning device includes two parallel linear guides provided with integrated linear drives, which support a separate X-carriage in a manner that allows movement in the X-direction, as well as a cross beam which is connected to the two X-carriages and movably supports a carriage in a Y-direction that extends perpendicular to the X-direction, with the aid of an integrated linear drive. In addition, the positioning device has a tool holder, which is guided on the Y-carriage in a Z-direction and holds a tool for machining a workpiece situated in an X-Y plane, the tool being disposed next to the cross beam at an offset in the X-direction. A force frame disposed above the tool in the Z-direction transmits a process force acting on the tool to the carriages LX1, LX2 without deforming the cross beam by a torque. The process force is applied by an electromagnet which acts between the force frame and the tool holder.

11 Claims, 3 Drawing Sheets

(51) Int. Cl.
  *B23Q 11/00* (2006.01)
  *G05B 19/404* (2006.01)
  *B23Q 1/62* (2006.01)

(52) U.S. Cl.
  CPC .. *G05B 19/404* (2013.01); *G05B 2219/49271* (2013.01); *Y02P 90/265* (2015.11)

(56) References Cited

U.S. PATENT DOCUMENTS

2010/0066298 A1* 3/2010 Coleman ............. G01B 5/0014
  318/652
2014/0291270 A1 10/2014 Heiniger et al.

FOREIGN PATENT DOCUMENTS

| | | |
|---|---|---|
| DE | 10 2009 008 900 | 11/2009 |
| EP | 2 066 996 | 6/2009 |
| EP | 2 783 791 | 10/2014 |

* cited by examiner

POSITIONING DEVICE

FIELD OF THE INVENTION

The present invention relates to a positioning device for machining a workpiece or for placing components in a plane. For example, such positioning devices are used for positioning electronic components on a circuit board or also for machining flat workpieces with the aid of a tool.

BACKGROUND INFORMATION

A portal-type positioning device is described in European Patent No. 2 066 996; in this case, a transverse beam is supported in a mobile manner between two parallel linear guides, on which a functional element is movably held via a further linear guide, so that this functional element can be freely positioned in a plane between the two linear guides. For example, a gripper of a pick-and-place machine, a laser of a laser-machining center or also a probe system of a coordinate measuring machine are examples of functional elements. European Patent No. 2 066 996 focuses mainly on the most precise position measurement possible in such positioning devices, because precise positioning of the functional element is frequently of the utmost importance.

German Published Patent Application No. 10 2009 008 900 also relates to portal-type positioning devices of this type. For various reasons, they are not easily controllable from the standpoint of control engineering. Therefore, a device for controlling a positioning device is disclosed, which provides for especially precise positioning.

However, if the functional element which is guided on the transverse beam and positioned above the workpiece must exert considerable force on the workpiece, this may cause a deformation of the components of the positioning device. Because of the high leverages that are produced by the portal construction, even small deformations may result in a considerable displacement of the contact point of the tool on the workpiece, which is unacceptable for applications that make high demands on the positioning accuracy. One example of such an application is thermal compression bonding, in which electronic components are connected to a circuit board with the aid of pressure and heat. Forces of up to 500 N may be required for this purpose. On the other hand, positioning accuracies in the range of one micrometer and less required in such and similar applications are not unusual.

European Patent No. 2 783 791 describes routing the process forces acting on the tool not via the transverse beam of the portal-type positioning device, but by way of a separate force frame which is situated above the tool. The process force is thereby no longer applied by the portal-type positioning device, but by a pneumatic cylinder which is acting between the tool and the force frame. However, such pneumatic cylinders make it difficult to achieve a rapid switch between a high process force and pressure relief, as is advantageous for some applications, for instance thermal compression bonding.

SUMMARY

Example embodiments of the present invention provide a portal-type positioning device that provide for precise positioning of the functional element in spite of the high process forces, and which allows a rapid switch between a high process force and unloading of the tool at the same time.

A portal-type positioning device is described, which has two parallel linear guides provided with integrated linear drives, which support a separate X-carriage in an X-direction in a manner allowing movement; it also includes a cross beam which is connected to the two X-carriages and which uses an integrated linear drive to movably support a Y-carriage in a Y-direction that extends at a right angle to the X-direction. In addition, the positioning device has a tool holder, which is guided on the Y-carriage in a Z-direction and holds a tool for machining a workpiece situated in an X-Y plane, the tool being disposed next to the cross beam at an offset in the X-direction. A force frame situated above the tool in the Z-direction transmits a process force that is acting on the tool to the carriages. The process force is applied by an electromagnet which acts between the force frame and the tool holder.

The force frame therefore ensures that the actually disadvantageous placement of the tool laterally on the cross beam does not result in a torque that would deform the cross beam and thus have a detrimental effect on the positioning accuracy of the tool. The working area of the electromagnet may be relatively small at typically under one millimeter, but since the force is required only in defined positions in many applications, such as thermal compression bonding, it is entirely sufficient. Electromagnets can be switched on and off again very quickly, so that a very precise control of the process force is possible.

Further advantages as well as details of example embodiments of the present invention are described below with reference to the appended Figures.

DETAILED DESCRIPTION

Figure 1:
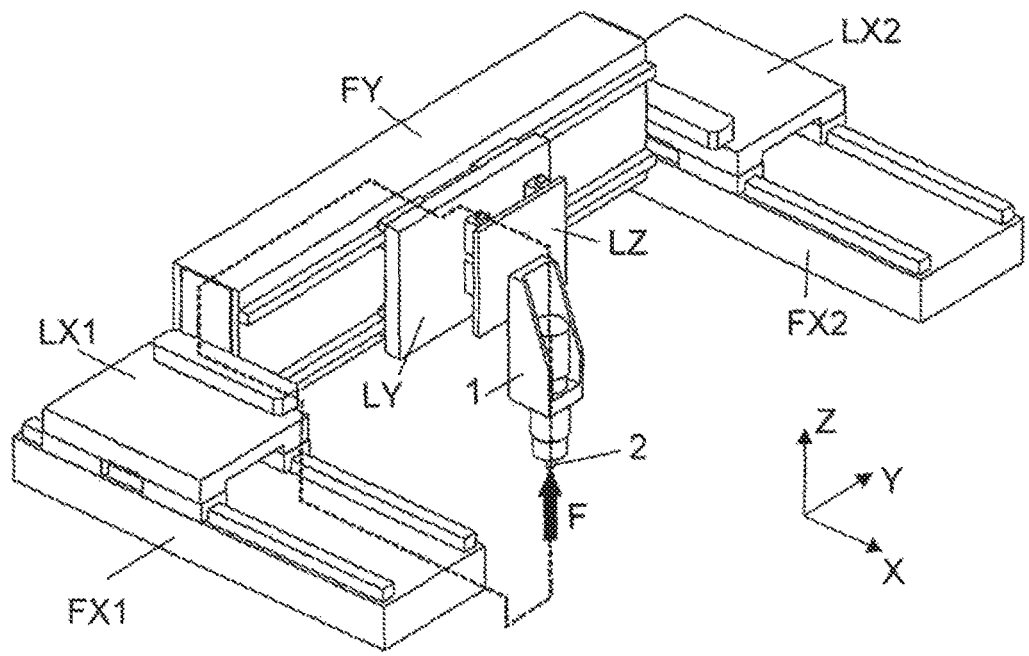
FIG. 1 illustrates a conventional portal-type positioning device.

FIG. 1 shows a conventional portal-type positioning device. Two linear guides FX1, FX2 having integrated linear drives, which support two X-carriages LX1, LX2 so as to allow movement in the X-direction, are disposed in parallel with each other in an X-direction. A linear guide, which forms cross beam FY of the portal frame of the positioning device, is fixed in place on the two carriages LX1, LX2. This cross beam FY may be positioned above the working region between the two linear guides FX1 and FX2 in the X-direction.

A Y-carriage, which is able to be positioned between the two linear guides FX1 and FX2 in the Y-direction with the aid of a further linear drive, is movably guided on linear guide FY. By appropriate control of the drives in linear guides FX1, FX2 and FY, Y-carriage LY can be freely positioned above the working range between the two linear guides FX1 and FX2.

Y-carriage LY carries a further linear guide including an integrated drive, which supports a Z-carriage LZ in a manner that allows it to move in the Z-direction that extends at a right angle to the machining plane defined by the X- and Y-direction.

As a result, a tool holder 1 fixed in place on Z-carriage LZ and a tool 2 it holds are able to be positioned in all three spatial directions X, Y and Z. Tool 2, for example, may be a gripper which picks up an electronic component and places it on a circuit board situated in the working area. The drive of Z-carriage LZ provides force F required for this purpose. Since Z-carriage LZ is disposed laterally on cross beam FY at an offset in the X-direction, this vertical force F in the Z-direction results in a torque on cross beam FY.

The designation "at an offset in the X-direction" here and in the rest of the description refers to a distance in the X-direction of the projection of two elements (in this case, cross beam FY and Z-carriage LZ) in the X-Y plane.

A dashed line in FIG. 1 indicates the force loop that applies a load to the components of the positioning device when tool 2 sets down on the workpiece disposed in the X-Y plane. As illustrated, cross beam FY is part of this force loop, which results in disadvantages when high forces are encountered.

Figure 2:
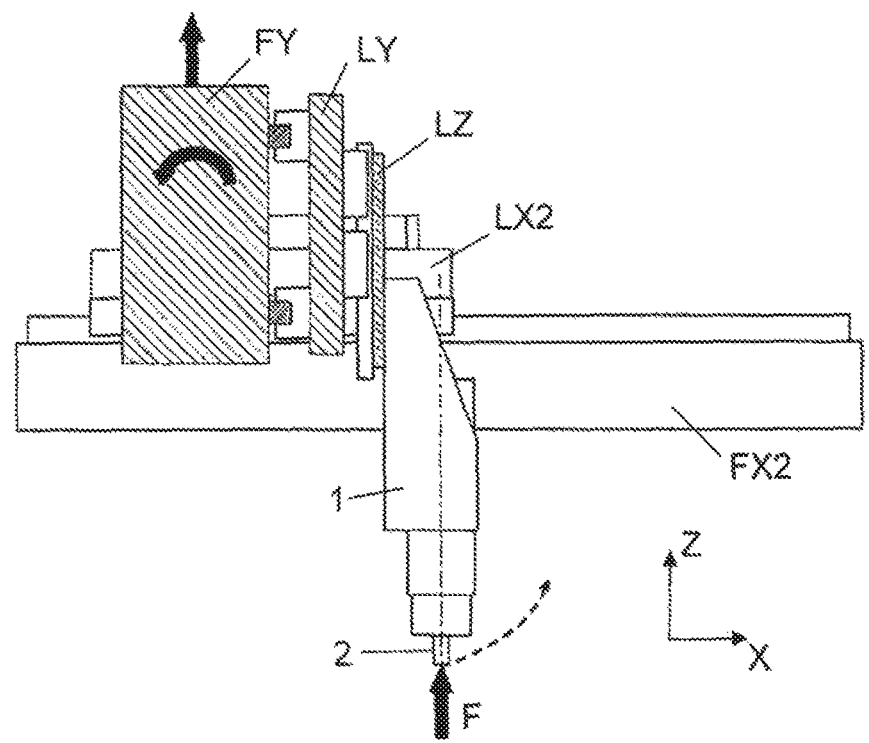
FIG. 2 illustrates the problem arising in conventional devices in the presence of large process forces.

FIG. 2 is a cross-sectional view through the positioning device illustrated in FIG. 1. The section lies in the X-Z plane and passes through Z-carriage LZ. It can be seen that due to the very asymmetrical configuration of the positioning device, a high torque occurs because of a high process force F that may arise, for example, during thermoelectrical bonding of a components to a circuit board, the torque possibly deforming cross beam FY of the portal frame and thereby leading to a deflection of tool 2. This deflection is indicated by a dashed arrow on tool 2. During the thermal compression bonding this deflection also results in tilting of a component to be placed, so that is not possible to provide the required high parallelism between component and circuit board.

A simple solution for avoiding this torque would be a configuration of the positioning device that is symmetrical with regard to process force F. However, there may be specifications that make such a symmetrical configuration impossible. For example, it may be necessary for linear guides LX1, LX2 to support a second cross beam having a second tool which must be brought very close to first tool 2. As illustrated in FIGS. 1 and 2, the two tools will then have to be positioned on the sides on their respective cross beams in order to achieve this goal.

Figure 3:
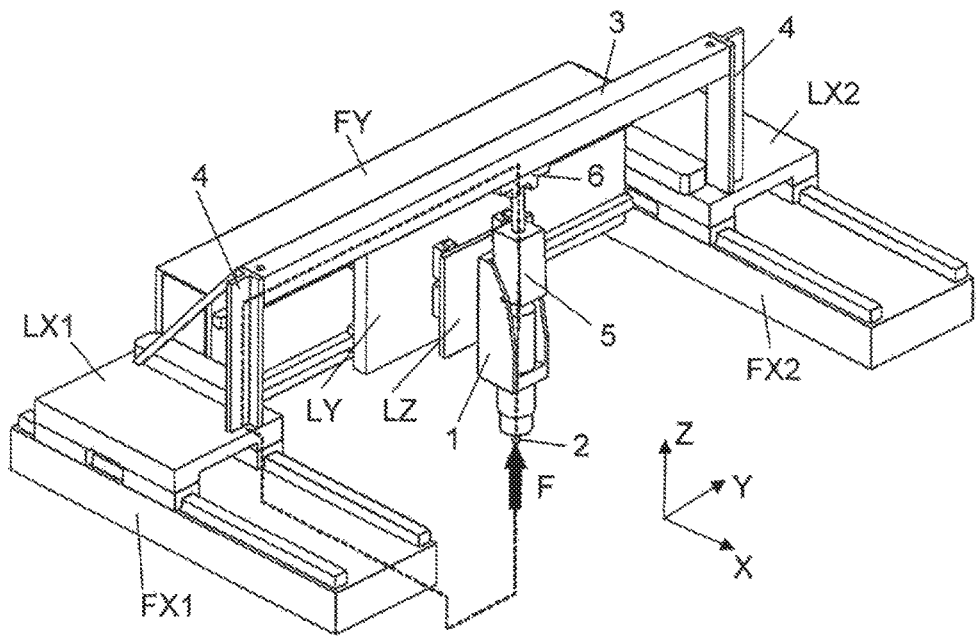
FIG. 3 illustrates a further conventional portal-type positioning device.

FIG. 3 therefore illustrates a modification of the conventional positioning device as described in European Patent No. 2 783 791.

An additional force frame 3 is used. This force frame 3 extends parallel to cross beam FY of the portal frame. However, its projection into the X-Y machining plane does not lie far away from the contact point of process force F (like the projection of cross beam FY), but considerably closer to this engagement point, ideally above this contact point in the Z-direction. One end of a pneumatic cylinder 5 is braced on this force frame 3, its other end is connected to tool holder 1. This pneumatic cylinder 5 applies the predominant share of process force F, which is absorbed by force frame 3 and transmitted via supports 4 to carriages LX1 and LX2. Process force F must consequently not be absorbed by cross beam FY. The asymmetry of the mechanics thus no longer exists or is at least are considerably reduced in terms of process force F. This therefore applies to the interfering torque and the resulting deflection of tool 2, as well.

Force frame 3 has a guide on its underside in order to allow tool holder 1 to be mobile in the Y-direction. Pneumatic cylinder 5 is fixed in place on carriage 6 of this guide. Tool holder 1 may thus continue to be positioned in the Y-direction by driven Y-carriage LY. The linear drive of the Z-carriage positions tool holder 1 in the Z-direction, but the required high process force F is applied by pneumatic cylinder 5 once tool 2 has set down on the workpiece. Since this force F is absorbed by force frame 3, no load is placed on the linear drive of Z-carriage LZ.

Force frame 3 requires a certain stiffness in the Z-direction in order to be able to absorb process force F; however, it need not be completely rigid since a certain amount of bending is compensated by pneumatic cylinder 5, and the process force is adjustable independently of the bending. Although the working region in the Z-direction amounts to a few centimeters in many applications (for instance in order to avoid collisions with components already placed in the working plane), the region in which a component needs to be set down with force is considerably smaller, for instance in the range of a millimeter.

The force loop acting in response to loading of the tool is illustrated in FIG. 3, as well. In a comparison with FIG. 1 it can be seen that cross beam FY is no longer part of this force loop. The torque discussed with reference to FIG. 2 which is especially disruptive, and the related deflection, no longer occurs.

As discussed in greater detail in German Published Patent Application No. 10 2009 008 900, a certain flexibility is required between cross beam FY of a portal frame and the two parallel linear guides FX1, FX2, because the two parallel running X-carriages LX1, LX2 are never able to be controlled in exactly the same manner. Suitable interfaces, e.g., in the form of flexible articulated joints, must be provided on cross beam FY for this purpose. One disadvantage of this system is that this necessary flexibility must also be taken into account for force frame 3 in terms of its construction, which increases the cost of such a solution. It is therefore also possible (in a manner not illustrated here) to brace force frame 3 with the aid of supports directly at the outer ends of cross beam FY, and as closely as possible to its interfaces (e.g., articulated joints). Force frame 3 does not require its own solution for compensating slightly different positioning of the two X-carriages LX1, LX2 in the X-direction. However, the interfaces of cross beam FY with respect to X-carriages LX1, LX2 must absorb process force F in full and therefore have a correspondingly sturdier configuration.

Figure 4:
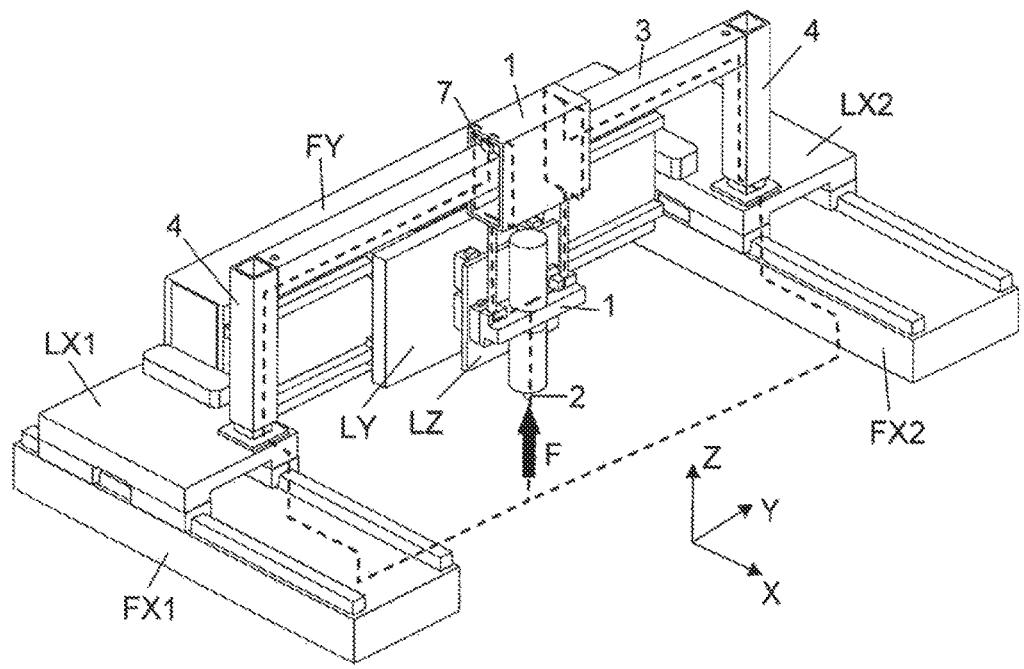
FIG. 4 illustrates a positioning device according to an exemplary embodiment of the present invention.
Figure 5:
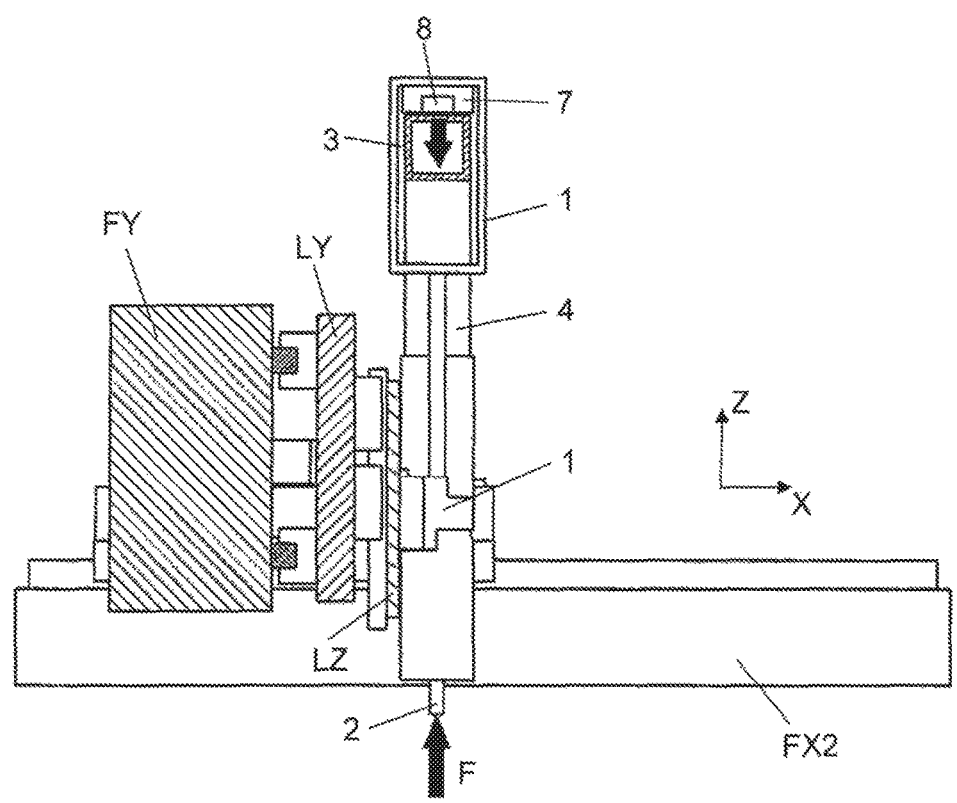
FIG. 5 is a side view of positioning device illustrated in FIG. 4.

FIG. 4 (oblique view) and FIG. 5 (side view) illustrate a further variant of the positioning device illustrated in FIG. 3. Instead of a relatively sluggishly reacting pneumatic cylinder, an electromagnet 7 provides the required high process force F.

Electromagnet 7 is connected to a region of tool holder 1 that surrounds force frame 3 and is disposed above force frame 3 such that it generates a force which presses electromagnet 7, and thus tool holder 1 and tool 2, "in the downward direction" toward force frame 3 in the activated state. For example, tool 2 is thereby able to join an electronic component by thermal compression bonding to a substrate situated in the working region between linear guides FX1, FX2.

As illustrated, the region of tool holder 1 enveloping force frame 3, for example, is arranged as a hollow profile having a rectangular cross-section, through whose inner area force frame 3 is extending.

Electromagnet 7 may have an E-shaped core, onto whose center tooth a coil 8 is wound. The teeth are pointing toward force frame 3. The rear side of the E-shaped core is connected to the hollow profile.

Force frame 3 must always be at least partially made from a ferromagnetic material because it closes the magnetic circuit of electromagnet 7. A support, made from a light metal such as aluminum, having a ferromagnetic plate facing electromagnet 7 is one example of a suitable force frame 3. Force frame 3 should be slightly wider in the X-direction than electromagnet 7 in order to allow small movements of electromagnet 7, which lacks guidance in relation to force frame 3, without reducing process force F or without generating forces in the X-direction in the process.

The attractive force (and thus, process force F) of such electromagnet 7 becomes very high when the air gap between the E-shaped core and force frame 3 is less than approximately one millimeter, but it also diminishes very rapidly when this air gap becomes greater. This is so because the force generated by electromagnet 7 depends roughly on the square of the current flowing in coil 8 and the reciprocal value of the square of the air gap.

Force frame 3 can be deformed by the high process forces F. It may therefore be necessary to measure the size of the air gap with a distance sensor (e.g., in capacitive or inductive manner) and to take it into account in the closed-loop control by either adapting the coil current accordingly or by keeping the air gap constant.

In the side view of FIG. 5, it can be seen that the force generated by electromagnet 7 and process force F acting as counter force are aligned in an antiparallel manner and very precisely toward each other, so that no interfering torque is generated.

When tool 2 is lifted off and up from the machining plane in the Z-direction, electromagnet 7 moves away from force frame 3. Electromagnet 7 is unable to apply any force in this position, but this is also not necessary. It must merely be ensured that whenever tool is in a machining position, electromagnet 7 is always positioned on force frame 3 within a sufficient distance.

In order to make it possible to supply a process force F across a larger Z-region nevertheless (for instance when components having different heights or a substrate having different planes are to be processed), force frame 3 must be adjustable in the Z-direction, i.e., parallel to process force F. The drive for this adjustability need not be particularly dynamic and may be provided by a ball screw spindle or a wedge, for example. If force frame 3 is thereby placed in a position that matches the previously known machining position of tool 2, electromagnet 7 lies close enough on force frame 3.

Among advantages of an electromagnet 7 in this use are that it is operated only when a force is actually required and that it does not affect the dynamic response of the Z-axis when switched off. Electromagnet 7 is able to be controlled much more dynamically than a pneumatic cylinder, and process force F is therefore able to be applied faster and more precisely.

What is claimed is:

1. A portal-type positioning device, comprising:
   two parallel linear guides including integrated linear drives that support individual X-carriages to provide for movement in an X-direction;
   a cross beam connected to the two X-carriages and including an integrated linear drive that supports a Y-carriage to provide for movement in a Y-direction perpendicular to the X-direction;
   a tool holder guided on the Y-carriage in a Z-direction that is perpendicular to the X- and Y-directions, and carrying a tool for machining a workpiece that is situated in an X-Y plane, the tool being arranged adjacent the cross beam at an offset in the X-direction; and
   a force frame arranged in the Z-direction above the tool and extending parallel to the cross beam, the force frame adapted to transmit a process force, directed in the Z-direction, that is acting on the tool, to the X-carriages;
   wherein the process force is generated by an electromagnet that acts between the force frame and the tool holder.

2. The positioning device according to claim 1, wherein the force frame transmits the process force to the X-carriages by supports without deformation of the cross beam.

3. The positioning device according to claim 1, wherein the force frame is fixed in place on the X-carriages by supports.

4. The positioning device according to claim 1, wherein the force frame is fixed in place on ends of the cross beam by supports.

5. The positioning device according to claim 1, wherein the electromagnet is connected to a region of the tool holder that encloses the force frame.

6. The positioning device according to claim 5, wherein the region of the tool holder that encloses the force frame includes a hollow profile having a rectangular cross-section.

7. The positioning device according to claim 1, wherein the force frame includes a light metal support having a ferromagnetic plate that faces the electromagnet.

8. The positioning device according to claim 1, wherein a position of the force frame is adjustable parallel to the process force.

9. The positioning device according to claim 1, wherein the force frame is arranged in the Z-direction directly above the tool.

10. A portal-type positioning device, comprising:
    two parallel linear guides including integrated linear drives that support individual X-carriages to provide for movement in an X-direction;
    a cross beam connected to the two X-carriages and including an integrated linear drive that supports a Y-carriage to provide for movement in a Y-direction perpendicular to the X-direction;
    a tool holder guided on the Y-carriage in a Z-direction that is perpendicular to the X- and Y-directions, and carrying a tool for machining a workpiece that is situated in an X-Y plane, the tool being arranged adjacent the cross beam at an offset in the X-direction; and
    a force frame arranged in the Z-direction above the tool and extending parallel to the cross beam, the force frame adapted to transmit a process force, directed in the Z-direction, that is acting on the tool, to the X-carriages;
    wherein the process force is generated by an electromagnet that acts between the force frame and the tool holder; and
    wherein the electromagnet includes an E-shaped core, and a coil wound around a center tooth of the E-shaped core.

11. The positioning device according to claim 10, wherein teeth of the E-shaped electromagnet point toward the force frame.

* * * * *